US010223609B2

(12) United States Patent
Bhanu et al.

(10) Patent No.: US 10,223,609 B2
(45) Date of Patent: Mar. 5, 2019

(54) PASSENGER VEHICLE MAKE AND MODEL RECOGNITION SYSTEM

(71) Applicant: The Regents of the University of California, Oakland, CA (US)

(72) Inventors: Bir Bhanu, Riverside, CA (US); Ninad Thakoor, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/283,869

(22) Filed: Oct. 3, 2016

(65) Prior Publication Data

US 2017/0097944 A1     Apr. 6, 2017

Related U.S. Application Data

(60) Provisional application No. 62/236,353, filed on Oct. 2, 2015.

(51) Int. Cl.
| G06K 9/00 | (2006.01) |
| G06K 9/46 | (2006.01) |
| G06K 9/42 | (2006.01) |
| G06K 9/62 | (2006.01) |

(52) U.S. Cl.
CPC ....... *G06K 9/4671* (2013.01); *G06K 9/00785* (2013.01); *G06K 9/42* (2013.01); *G06K 9/6206* (2013.01)

(58) Field of Classification Search
CPC .................. G06K 2209/23; G06T 2207/30248
See application file for complete search history.

(56) References Cited

U.S. PATENT DOCUMENTS

| 2002/0134151 | A1* | 9/2002 | Naruoka | G01S 11/12 |
| | | | | 73/291 |
| 2007/0183651 | A1* | 8/2007 | Comaniciu | G06K 9/00248 |
| | | | | 382/154 |
| 2008/0294401 | A1* | 11/2008 | Tsin | G06F 17/5095 |
| | | | | 703/8 |
| 2014/0270383 | A1* | 9/2014 | Pederson | G08B 13/19647 |
| | | | | 382/104 |
| 2017/0097944 | A1* | 4/2017 | Bhanu | G06K 9/4671 |

OTHER PUBLICATIONS

Khan, Saad M., et al. "3D model based vehicle classification in aerial imagery." Computer Vision and Pattern Recognition (CVPR), 2010 IEEE Conference on. IEEE, 2010. (Year: 2010).*
Thakoor, Ninad S., and Bir Bhanu. "Structural signatures for passenger vehicle classification in video." IEEE Transactions on Intelligent Transportation Systems 14.4 (2013): 1796-1805. (Year: 2013).*

(Continued)

*Primary Examiner* — Avinash Yentrapati
(74) *Attorney, Agent, or Firm* — Buchanan Ingersoll & Rooney PC

(57) ABSTRACT

A system, a method, and a non-transitory computer readable recording medium for recognizing a passenger vehicle make and model are disclosed, which includes a make and model recognition (MMR) database, which is constructed from rear view videos of passenger vehicles.

20 Claims, 5 Drawing Sheets

(56) References Cited

OTHER PUBLICATIONS

Su, Hang, et al. "Multi-view convolutional neural networks for 3d shape recognition." Proceedings of the IEEE international conference on computer vision. 2015. (Year: 2015).*

Petrovic et al., "Analysis of Features for Rigid Structure Vehicle Type Recognition," pp. 1-10, Imaging Science Bimedical Engineering, University of Manchester, UK.

Dlagnekov et al., "Recognizing Cars," pp. 1-8, Department of Computer Science and Engineering, University of California, San Diego, CA.

Negri et al., "An Oriented-Contour Point Based Voting Algorithm for Vehicle Type Classification," pp. 1-4.

Zafar et al., "Localised Contourlet Features in Vehicle Make and Model Recognition," Loughborough University Institutional Repository, 2009, pp. 1-11, vol. 7251, Society of Photo-Optical Instrumentation Engineers.

Pearce et al., "Automatic Make and Model Recognition from Frontal Images of Cars," 8th IEEE International Conference on Advanced Video and Signal-Based Surveillance, 2011, pp. 373-378, IEEE.

Liu et al., "SIFT Flow: Dense Correspondence across Scenes and its Applications," To Appear at IEEE Transactions on Pattern Analysis and Machine Intelligence, pp. 1-17.

Vedaldi et al., "VLFeat—An Open and Portable Library of Computer Vision Algorithms," 2010, pp. 1-4, Firenze, Italy, AMC.

"Dynamic Time Warping," pp. 69-84.

Struc et al., "Photometric Normalization Techniques for Illumination Invariance," ResearchGate, Jan. 2011, pp. 1-37.

Tan et al., "Enhanced Local Texture Feature Sets for Face Recognition Under Difficult Lighting Conditions," pp. 168-182, Springer-Verlag Berlin Heidelberg.

Dalal et al., "Histogram of Oriented Gradients for Human Detection," pp. 1-8.

Thakoor et al., "Automatic Video Object Shape Extraction and its Classification with Camera in Motion," 2005, pp. 1-4. IEEE.

Thakoor et al., "Structural Signatures for Passenger Vehicle Classification in Video," IEEE Transactions on Intelligent Transportation Systems, 2013, pp. 1-10, IEEE.

* cited by examiner

PASSENGER VEHICLE MAKE AND MODEL RECOGNITION SYSTEM

CROSS-REFERENCES TO RELATED APPLICATIONS

This application claims priority to U.S. Provisional Patent Application No. 62/236,353, filed Oct. 2, 2015, the entire contents of which is incorporated herein by reference in its entirety.

FIELD

The present disclosure relates to a system for recognizing make and model of passenger vehicles from their rear view videos is developed, and a novel two-step alignment mechanism at two-levels is used to identify make and model of the vehicle simultaneously.

SUMMARY

In accordance with an exemplary embodiment, a system for recognizing a passenger vehicle make and model comprises: a make and model recognition (MMR) database, which is constructed from rear view videos of passenger vehicles; a universal view (MMRDB), which is generated from the make and model recognition database by averaging images from the make and model recognition database, and wherein images generated are identified as "UVaMMRDB"; a showcase view, which represent visually distinct types of vehicles, and wherein copies of the images aligned to their type specific showcase view and stored in the MMR database, and wherein the images are identified as "SVaMMRDB"; a moving object detection system, which is configured to detect region of interest (ROI) of passenger vehicles for classification, and the ROI is registered with the universal view, which aligns landmarks in the ROI, the aligned ROI is identified as the universal view aligned ROI ("UVaROI"), after illumination normalization, the UVaROI is compared to UVaMMRDB to find the nearest neighbors in the MMRDB, and based on the nearest neighbors a type is assigned to the ROI, and the ROI is registered with the showcase view of the type to which it is assigned to and the registration process aligns landmarks in the ROI and the showcase view, and the showcase view aligned ROI is identified as "SVaROI"; and wherein after illumination normalization, the SVaROI is compared to SVaMMRDB to find the nearest neighbors in the MMRDB, and based on these neighbors a make and model is assigned to the ROI.

In accordance with another exemplary embodiment, a method for recognizing a passenger vehicle make and model comprises: constructing a make and model recognition (MMR) database, which is constructed from rear view videos of passenger vehicles; generating a universal view (MMRDB) from the make and model recognition database by averaging images from the make and model recognition database, and wherein images generated are identified as "UVaMMRDB"; representing visually distinct types of vehicles, and wherein copies of the images aligned to their type specific showcase view are stored in the MMR database and identified as "SVaMMRDB"; providing a moving object detection system, which is configured to detect region of interest (ROI) of passenger vehicles for classification, and the ROI is registered with the universal view, which aligns landmarks in the ROI, and wherein the aligned ROI is identified as the universal view aligned ROI ("UVaROI"); after illumination normalization, comparing the UVaROI to UVaMMRDB to find the nearest neighbors in the MMRDB, and based on the nearest neighbors, assigning a type to the ROI, and registering the ROI with the showcase view of the type to which it is assigned to and the registration process aligns landmarks in the ROI and the showcase view, and wherein the showcase view aligned ROI is identified as "SVaROI"; and wherein after illumination normalization, comparing the SVaROI to SVaMMRDB to find the nearest neighbors in the MMRDB, and based on these neighbors assigning a make and model to the ROI.

In accordance with a further exemplary embodiment, a non-transitory computer readable recording medium stored with a computer readable program code for recognizing a passenger vehicle make and model, the computer readable program code configured to execute a process comprising: constructing a make and model recognition (MMR) database, which is constructed from rear view videos of passenger vehicles; generating a universal view (MMRDB) from the make and model recognition database by averaging images from the make and model recognition database, and wherein images generated are identified as "UVaMMRDB"; representing visually distinct types of vehicles, and wherein copies of the images aligned to their type specific showcase view are stored in the MMR database and identified as "SVaMMRDB"; providing a moving object detection system, which is configured to detect region of interest (ROI) of passenger vehicles for classification, and the ROI is registered with the universal view, which aligns landmarks in the ROI, and wherein the aligned ROI is identified as the universal view aligned ROI ("UVaROI"); after illumination normalization, comparing the UVaROI to UVaMMRDB to find the nearest neighbors in the MMRDB, and based on the nearest neighbors, assigning a type to the ROI, and registering the ROI with the showcase view of the type to which it is assigned to and the registration process aligns landmarks in the ROI and the showcase view, and wherein the showcase view aligned ROI is identified as "SVaROI"; and wherein after illumination normalization, comparing the SVaROI to SVaMMRDB to find the nearest neighbors in the MMRDB, and based on these neighbors assigning a make and model to the ROI.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 3A-3F are illustrations of a two-step alignment, wherein FIG. 3A is a target image, FIG. 3B is a query image, FIG. 3C is a vertical alignment cost (Hotter colors indicate higher costs) and solution, FIG. 3D is horizontal alignment cost and solution, FIG. 3E is aligned query, and FIG. 3F is a query aligned with SIFT flow.

FIGS. 5A-5F illustrate Universal and Showcase views, wherein FIG. 5A is a Universal view Iteration 1, FIG. 5B is a Universal view Iteration 5, FIG. 5C is a Sedan showcase view Iteration 5, FIG. 5D is Pickup showcase view Iteration 5, FIG. 5E is a Minivan showcase view Iteration 5, and FIG. 5F is a SUV showcase view Iteration 5.

DETAILED DISCLOSURE

Figure 1:
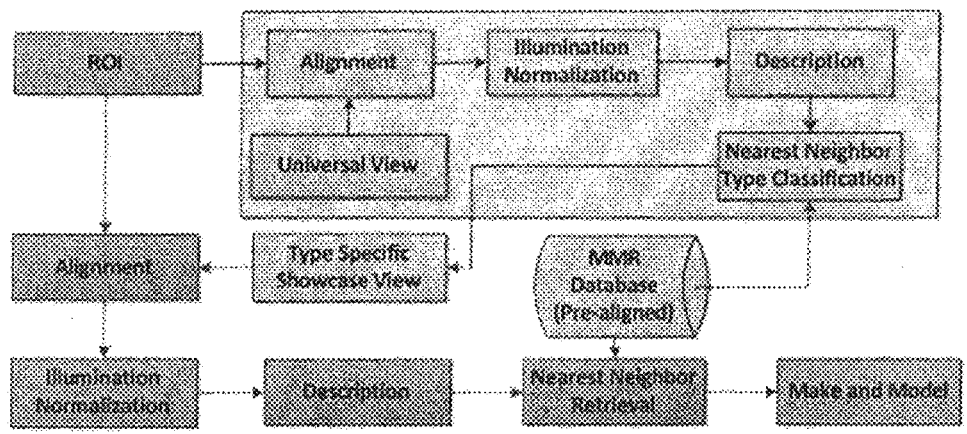
FIG. 1 is an illustration of a software system for recognizing make and model of passenger vehicles from their rear view video in accordance with an exemplary embodiment.

In accordance with an exemplary embodiment, a software system for recognizing make and model of passenger vehicles from their rear view videos is disclosed. The software system includes a make and model recognition (MMR) database, a universal view, showcase view, and a moving object detection system to detect a region of interest. In accordance with an exemplary embodiment, the system can include a moving object detection system or sensor, preferably, for example, in the form of a camera, and a computer system or processing unit. In accordance with an exemplary embodiment, the detection system or sensor can be configured to perform all activity recognition on its own embedded hardware and transfers all necessary information such as video stream and recognized activity to the computer system or processing unit. The computer system or processing unit is configured to analyze and process data received from the detection system or sensor. In accordance with an exemplary embodiment, the computer system or processing unit includes a display unit, for example, a graphical user interface (GUI) for displaying the results of the system as disclosed herein.

The make and model recognition (MMR) database is constructed from rear view videos of passenger vehicles. Initially, this database holds rear view images of passenger vehicles as well as their make and model information. A universal view is then generated to represent the MMR database (MMRDB). In accordance with an exemplary embodiment, an initial estimate of the universal view is generated by averaging images in the database. The universal view is iteratively improved by aligning the database to the current universal view and averaging the aligned images. Copy of the images aligned to the universal view is also stored in the MMR database and the images are identified as "UVaMMRDB".

Showcase views are then generated to represent visually distinct types of vehicles. The system uses for four visually distinct types: sedan, pickup, minivan and SUV. The initial showcase view for a vehicle type is generated by averaging images of the particular vehicle type in the database. The showcase view is iteratively improved by aligning the images of the particular vehicle type with current showcase view and averaging the aligned images. Copies of the images aligned to their type specific showcase view are also stored in the MMR database, and the images are identified as "SVaMMRDB".

A moving object detection system is used detect region of interest (ROI) which includes the passenger vehicle to be classified. The ROI is registered with the universal view. The registration process aligns landmarks in the ROI and the Universal view. For example, due to rigid nature of the vehicles a two-step alignment process can be used: first align the rows followed by the columns. However, the steps are interchangeable. The aligned ROI is identified as the Universal view aligned ROI (UVaROI).

After illumination normalization, the UVaROI is compared to UVaMMRDB to find the nearest neighbors in the MMRDB. Based on these neighbors a type is assigned to the ROI. The ROI is registered with the showcase view of the type to which it is assigned. The registration process aligns landmarks in the ROI and the Showcase view, and the showcase view aligned ROI is identified as ("SVaROI").

After illumination normalization, the SVaROI is compared to SVaMMRDB to find the nearest neighbors in the MMRDB. Based on these neighbors a make and model is assigned to the ROI.

For example, applications of the system can include (1) identifying make and model of vehicles on the road; (2) parking garage or parking lot allocation can be carried out based on vehicle make and model; (3) vehicle fingerprinting and security related applications ensuring limited/controlled access to vehicles; and (4) in conjunction with automatic license plate recognition and vehicle registration database, vehicle make and model verification can be carried out to avoid license plate spoofing.

In addition, variations of the system can include: (1) the system can be implemented for finding the make and model of the vehicles from front and/or side views; (2) only the type classification part of the system can be implemented; (3) only make recognition can be carried out by ignoring the model information; and (4) types of vehicles used in the system can be changed either by removing some of the types or by adding more vehicle types such as hatchbacks, crossovers, etc.

In addition, machine learning technique can also be used to decide these types in an unsupervised way. Make and model recognition works in the literature have practical limitations as they work only when accurate location of the license plate is known, view-points and illumination are consistent. For example, the system and method as disclosed does not have these assumptions and can work under varying illuminations and views.

In accordance with an exemplary embodiment, a make and model recognition system is disclosed for passenger vehicles. In accordance with an exemplary embodiment, a two-step efficient alignment mechanism to account for viewpoint changes is proposed. The 2D alignment problem is solved as two separate one dimensional shortest path problems. To avoid the alignment of the query with the entire database, reference views are used. These views are generated iteratively from the database. To improve the alignment performance further, use of two references is proposed: a universal view and type specific showcase views. The query is aligned with universal view first and compared with the database to find the type of the query. Then the query is aligned with type specific showcase view and compared with the database to achieve the final make and model recognition.

The ability to detect make and model of a vehicle has important application in areas of surveillance, controlled access, law enforcement, traffic monitoring, collecting tolls, and other government and business functions. Currently, the identity of a vehicle can be tied to its license plate alone, and today's automatic license plate recognition systems claim close to 100% accuracy. However, these systems have no reliable way to detect spoofing of a license plate—the use of a plate from another vehicle or alteration of the plate. If make and model information extracted from the video or images of a vehicle can be verified with information associated with the license plate, spoofing can be detected. Thus, the ability to automatically recognize the make and model of a vehicle provides the new capability to verify the identity of a vehicle with added certainty.

Table 1 shows overview of some of the related make and model recognition work.

Alignment

In accordance with an exemplary embodiment, to compare an unknown vehicle with a vehicle in the database, for example, to query a vehicle to a MMR database, the images have to be properly registered such that corresponding visual landmarks are aligned (e.g., taillights, brake light, logo, window, etc.). This can be challenging due to perspective projection and as these landmarks are not necessarily copla-

TABLE 1

Related work

| Publication | Approach | Pros | Cons |
| --- | --- | --- | --- |
| Petrovic and Cootes [1] | Normalization for scale and location using LP, Features: Square mapped gradient, Classifier: k-NN with dot product | Gradient information is color independent; Weighting scheme based on variance | Pixel based representation; Features must line up; Reference LP location limits performance |
| Dlagnekov and Belongie [2] | Normalization for scale and location using LP (Not as strict as others), Features: SIFT, Classifier: WTA, maximum number of SIFT points matched | Real traffic videos used; affine distortion allowed | Point matching is computationally expensive, only 38 query images |
| Negri et al. [3] | Normalization for scale and location using LP, Features: Weighted discriminant/kNN | Uses positive and negative weights; Robust to partial occlusion | Needs multiple examples per class; Only a small local deformation allowed |
| Zafar et al. [4] | Normalization for scale and location using LP, Features: Contourlet transform, Classifier: 2D LDA + SVM | Localized features | Localized features must line up |
| Pearce and Pears [5] | Affine normalization using LP, Features: Harris corners, Classifiers: kNN and naive Bayes | Recursive partitioning for representation; Local normalization | Relies on LP for alignment |

The key limitation of these approaches is that the previous works rely on the license plate (LP) for alignment and at best account for affine deformation.

If one has a database of images of all the possible makes and models of vehicles, then in theory, the make and model of a vehicle observed in a video can be found by matching it with the database. This is called a database make and model recognition (MMR) database. The challenges in matching an image of an unknown vehicle with the database of vehicles are:

1. View variation: Changes in the viewpoints can cause significant variations in the visual appearance of a vehicle.

2. Changing illumination: As a vehicle has to be observed in the real-world outdoor environment, inconsistencies in illumination between the stored database and observed data, which cause appearance changes, have to be dealt with.

3. Various body colors: In addition to the illumination variation, varying body colors of vehicles cause additional visual variations.

4. Large number of make and models: Given that, there are hundreds of makes and models of vehicles, matching can become computationally expensive.

A system is disclosed, which deals with these challenges at various stages. In accordance with an exemplary embodiment, the images of the vehicles are assumed to be taken from a fixed position where the vehicle pose is more or less consistent. This scenario is sufficient for most traffic monitoring applications where a vehicle is seen from either the front or back.

Technical Approach

Figure 2:
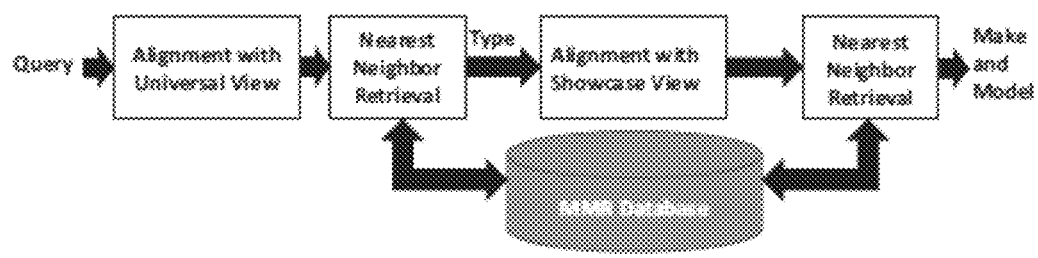
FIG. 2 is an illustration of a make and model recognition system in accordance with an exemplary embodiment.

In accordance with an exemplary embodiment, the overview of a make and model recognition system in accordance with an exemplary embodiment is shown in FIG. 2.

nar. Simple image rectification based on affine transformation or homography is not effective in this case. Instead, a method that allows local deformation has to be used. State-of-the-art methods such as SIFTflow allow for such deformation. However, SIFTflow is computationally expensive as it tries to solve 2D image alignment problem through belief propagation. In addition, the alignment results tend to overly deform the vehicles. An efficient two-step alignment method is proposed, which aligns rows first and then the columns. The minimization of the alignment cost is achieved as two separate 1D optimization problems, making the alignment computationally efficient.

Two-Step Alignment

Figures 3A, 3B, 3C, 3D, 3E, 3F:
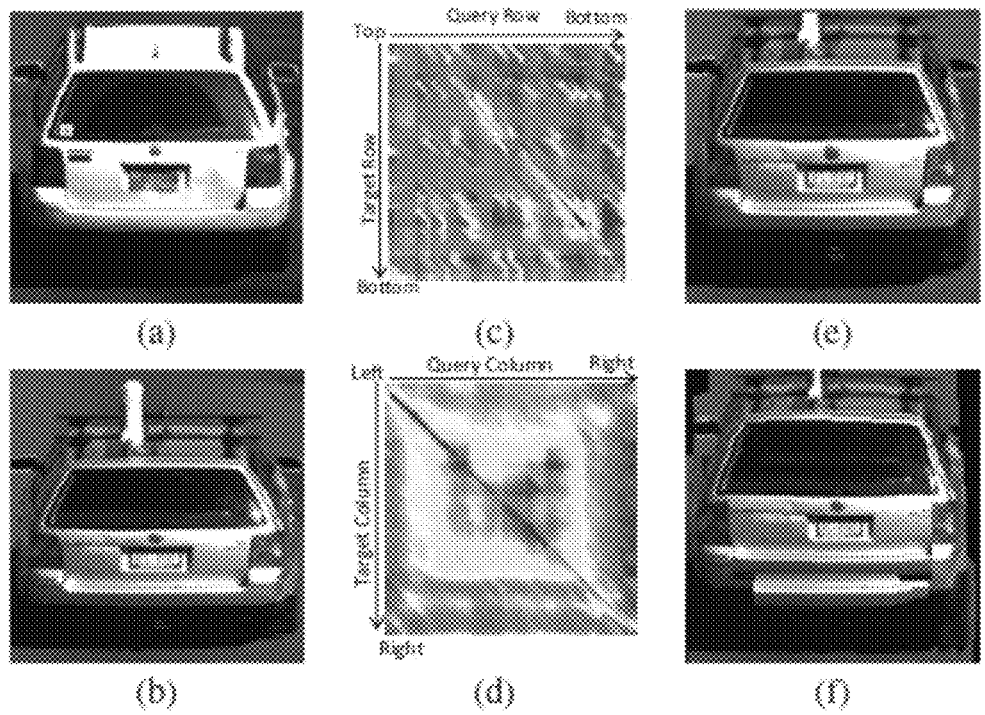

In accordance with an exemplary embodiment, a query image Q (FIG. 3B) is aligned to a target image T (FIG. 3A). For these images, dense local features such as dense-SIFT can be extracted which are denoted by $S_T$ and $S_Q$ respectively. The row-to-row alignment cost $D_r$ for target row $r_T$ and query row $r_Q$ can be computed as $$D_r(r_T, r_Q) = \sum_{c=1}^{N_c} d(S_T(c, r_T), S_Q(c, r_Q))$$

where $N_c$ is the number of columns and $d(\cdot)$ represents a distance measure such as Euclidean, cosine etc. A classical technique such as dynamic time warping (DTW) can be applied to matrix $D_r$ (FIG. 3C) to find optimal alignment.

In accordance with an exemplary embodiment, a subpixel shortest path algorithm is proposed, which provides better alignment results. The algorithm is described in the next subsection. Based on the outcome of the algorithm, the query vertically Qv and recompute the dense descriptors SQv are aligned with the horizontal alignment by computing column-to-column alignment cost $D_c$ (FIG. 3D) as $$D_c(c_T, c_Q) = \sum_{r=1}^{N_r} d(S_T(c_T, r), S_{Q_v}(c_Q, r))$$

where $N_r$ is the number of rows. After computing the optimal horizontal alignment, the final aligned query Q* is generated (FIG. 3E).

Subpixel Shortest Path

Figures 4A, 4B:
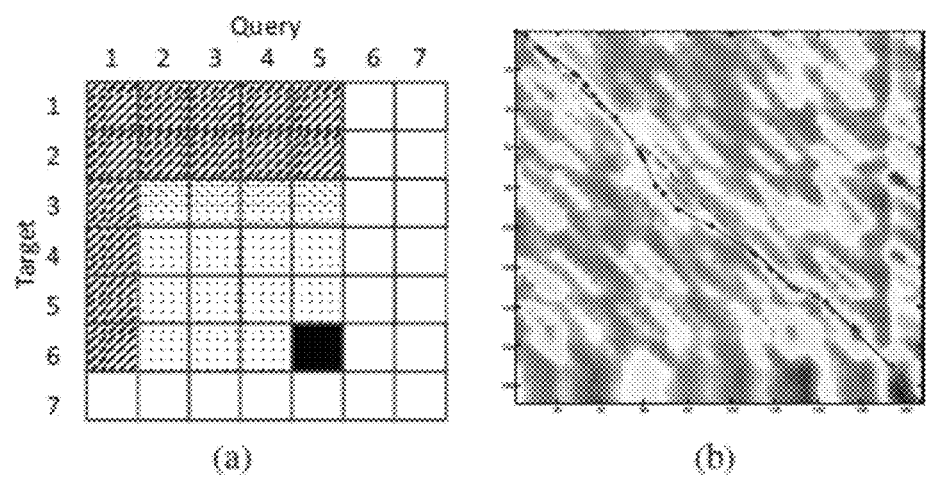
FIG. 4A is an illustration of nodes in the oriented graph with Nr=5 for the shortest path algorithm, node (5, 6) shown as dark square can terminate edges starting from nodes shown with diagonal and horizontal fill, wherein horizontally filled nodes fall inside a window of size W=3.
FIG. 4B is a comparison of solutions achieved with DTW (dotted line) and shortest path (solid line).

The algorithm to align the rows of query and target image is explained next. Each possible pair of corresponding rows forms vertices V of an oriented graph ($|V|=N_r^2$) which can be represented as a square grid as shown in FIG. 4. Each node can be represented as an ordered pair $(r_T, r_Q)$ where $r_T$, $r_Q \in \{1, 2, \ldots, N_r\}$. A directed edge between $v_i \equiv (r_T^i, r_Q^i)$ and $v_j \equiv (r_T^j, r_Q^j)$ should only exist only if $r_T^i \leq r_T^j$ and $r_Q^i \leq r_Q^j$ to preserve spatial order of the solution. To reduce the complexity of the shortest path search, only a vertices from a small square window of size W are connected such that $(r_T^i - r_T^j) \geq W$ and $(r_Q^i - r_Q^j) \geq W$. As the amount of deformations is much smaller compared to the entire image, this approximation still performs well practically. The weight of an edge is computed by adding row-to-row alignment cost along line connecting start and end nodes of the edge and then normalizing it.

$$\Omega_{ij} = \frac{Dist(v_i, v_j)}{|Line(v_i, v_j)|} \sum_{\forall (r_T, r_Q) \in Line(v_i, v_j)} D_r(r_T, r_Q)$$

In the square grid representation in FIG. 4, one can draw a line between $v_i$ to $v_j$. The function Line($v_i, v_j$) represents a digital line drawing procedure, which returns set of vertices falling on this line and Dist(vi, vj) gives Euclidean distance between $v_i$ and $v_j$ on the grid.

Alignment with Reference Views

Aligning each query with hundreds of targets in the database is computationally expensive. Instead, a reference can be chosen to which both the query and target images can be aligned. This reference is called the universal view. All the images in the database can be pre-aligned to the universal view, and only one alignment would be needed for each incoming query. However, selecting the universal view can be challenging, as it has to be chosen in such a way that any vehicle image irrespective of its type can be aligned to it. In accordance with an exemplary embodiment of the system, 4 (four) type of vehicles: sedan, pickup, minivan, and SUV can be defined. Note that additional types such as hatchback are possible, but are not used as they are not widespread.

Figures 5A, 5B, 5C, 5D, 5E, 5F:
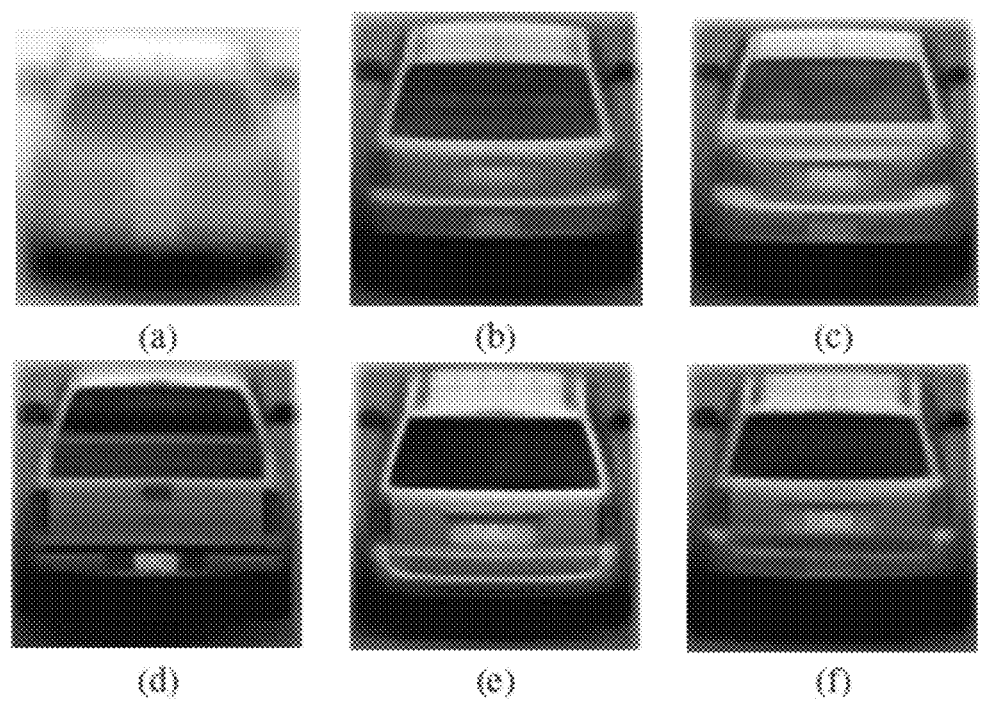

In accordance with an exemplary embodiment, an iterative approach can be used for generation of the universal view. During the first iteration, the universal view is nothing but the average of various vehicle images (see FIG. 4A). In the subsequent iterations, each image is aligned to the universal view from the last iteration, and then aligned images are averaged again to update the universal view. This process produces a universal view which combines visual features from different types of vehicles (see FIG. 5B).

As vehicles of similar type have more visual similarity, it makes more sense to create a reference for each type, which references are called showcase views. However, type of the query vehicle is also unknown. To deal with this, a hierarchical approach is used in which query image is first aligned to the universal view and the type of vehicle is determined by matching it with the MMR database. Then the query is aligned with the corresponding showcase view, and the make and model of the vehicle is determined by searching the MMR database. The proposed hierarchical alignment and recognition significantly reduces complexity of the recognition by requiring only two alignments per query and tackles the challenge arising from the large number of makes and models.

Illumination Normalization and Description Generation

Illumination Normalization

To deal with illumination and body color changes, a normalization step has to be applied to the query image. The goal of the normalization is to throw away illumination information while retaining the visual cues such as edges, which help in recognition. There are various alternatives available for illumination normalization. In accordance with an exemplary embodiment, a gamma correction can be performed followed by difference of Gaussian (DoG) filtering. The gamma correction can remove extreme illumination changes such as specular reflections and normalizes the dynamic range of the image. DoG filtering acts as a band pass filter, which removes flat areas and high frequency areas from the image.

Generation of Description

After the illumination normalization is carried out, the query image can be compared to the database to find its type first and then the make and model. In accordance with an exemplary embodiment, a direct pixel-to-pixel comparison is unreliable as alignment is not perfect. The cell and block partitioning scheme similar to one used by histogram of oriented gradients (HOG) is combined with locally normalized Harris strength (LNHS) features as the descriptors for comparison. LNHS uses Nobel's variation of corner strengths as the base feature. LNHS descriptor partitions the image recursively into quadrants. If at a level of recursion A, B, C, D are the quadrants, then the feature for quadrant A is extracted as ratio of sum of Harris strength over A to sum over A, B, C, D. This scheme locally normalizes the features. In accordance with an exemplary embodiment, this lacks fine control on the partitioning scheme and does not normalize across quadrants originating from different parent quadrants as they are non-overlapping, and the cell and block structure can be adapted instead.

In accordance with an exemplary embodiment, first, the image is split into small cells (for example, 16×16). Blocks are formed by combining the cells (for example, 2×2). The feature is computed for each cell in the block by normalizing it with respect to the entire block. The block is then shifted with some overlap to slide across the entire image (for example, shift by 1 cell at a time horizontally/vertically).

Summary of Computational Steps

Offline Steps:
 1. Generate the universal view.
 2. Generate type specific showcase views.
 3. Populate the MMR database. For each target image whose type, make and model are known, create universal view aligned image and type specific showcase view aligned image. Normalize illumination of aligned images and store them along with type, make and model information in the MMR database.

Query Steps:
 1. Align the query with the universal view and conduct illumination normalization of the aligned image.

2. Determine the type of the query by finding the nearest neighbor of the query by comparing with Universal view aligned images from MMR database.

3. Align the query with the type specific showcase view and conduct illumination normalization of the aligned image.

4. Determine the make and model of the query by finding the nearest neighbor of the query by comparing with type specific view aligned images from MMR database.

Experimental Results

Data: Videos were collected by setting up a camera on top of a freeway lane over several days during daytime. Vehicle ROI were detected using moving object detection approach from and they were further refined by removing shadows by enforcing bilateral symmetry. For each vehicle only the closest view was retained for make and model recognition. There were 1664 vehicles extracted from the videos. The ground truth for make and model was generated manually by three individuals. As some of the vehicles could not be identified, only 1505 vehicles were labeled. These vehicles represented 256 different makes and models with 173 of them with multiple examples. Each vehicle was also associated with one of the 4 (four) types namely sedan, minivan, pickup and SUV.

Implementation: The detected ROIs were resized to 200× 200. The universal and showcase views were generated by averaging and re-aligning for 5 iterations. During the alignment window of size W=10 was chosen for shortest path formulation. During the illumination normalization DoG filter with $\sigma_1=1.0$ and $\sigma_2=4.5$ was chosen. Harris strengths were computed with implementation from VLFeat $\sigma=2.0$. For description, the Harris strengths are split into 32×32 cells and normalized in 3×3 block. Descriptions are generated by shifting block by 1×1. To compare the descriptions, cosine distance is used.

Figure 6:
FIG. 6 is an illustration of example queries and top 5 retrievals (green indicates the correct match).

Results: FIG. 6 shows examples of queries and retrievals. First column shows the query images. Two examples are shown for each type sedan, minivan, SUV, and pickup. Columns 2 to 6 show the top 5 retrievals by the system. The retrievals marked by green are the correct retrievals. For the second minivan example, the system returns the correct make and model as the rank-3 candidate. The top candidates only differ by manufacturer logos and otherwise are visually identical. For the second pickup example, the system fails to return the correct make and model as the top candidate. This is primarily due to the fact that the pickup trucks appear very similar across different make and models.

Figure 7:
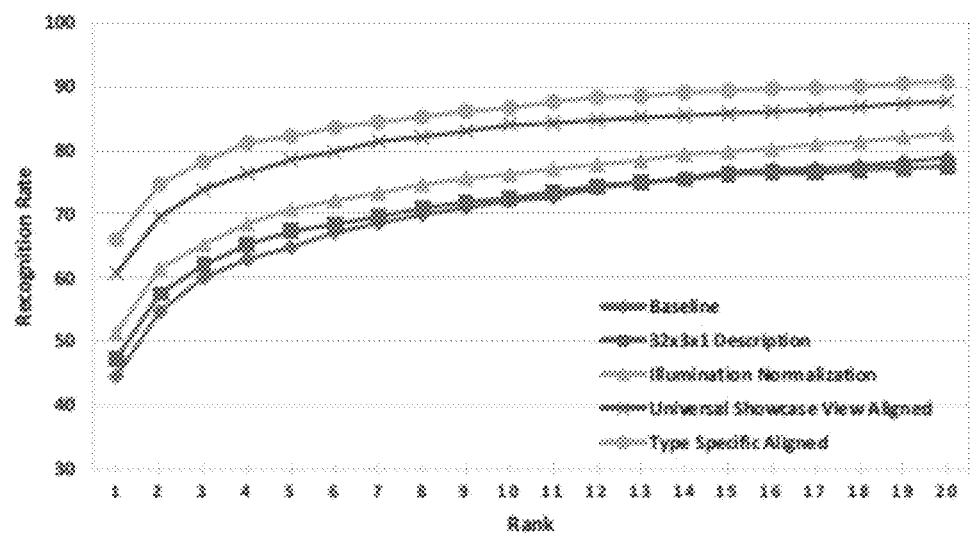
FIG. 7 is a chart showing cumulative match characteristics in accordance with an exemplary embodiment.

Cumulative match characteristic for top-20 retrievals can be seen in FIG. 7. LNHS description from G. Pearce and N. Pears, "Automatic make and model recognition from frontal images of cars," in *Proc. IEEE AVSS,* 2011 was used as the baseline which was computed on the resized vehicle ROIs directly. Although no alignment was used under the baseline case, the vehicles appear in very similar pose in the ROIs. Rank-1 accuracy for base line was nearly 44%. With the block based normalization, the rank-1 accuracy improves to nearly 47%. Illumination normalization further improves the accuracy to 51%. The most improvement can be seen with universal view alignment, which takes the accuracy to 61%. Finally, the type specific alignment achieves 66% rank-1 accuracy. Thus our approach for make and model recognition shows significant improvements over the baseline.

A make and model recognition system is disclosed, which system deals with challenges of view changes, illumination changes, body color variations, and large number of classes.

For alignment, an efficient 2-step process is proposed, which uses a shortest path formulation for accurate alignment. Through use of universal view and showcase views, the alignment complexity is reduced to only two alignments per query. In accordance with an exemplary embodiment, the proposed system outperforms the baseline significantly.

In accordance with a further exemplary embodiment, a non-transitory computer readable recording medium stored with a computer readable program code for recognizing a passenger vehicle make and model, the computer readable program code configured to execute a process comprising: constructing a make and model recognition (MMR) database, which is constructed from rear view videos of passenger vehicles; generating a universal view (MMRDB) from the make and model recognition database by averaging images from the make and model recognition database, and wherein images generated are identified as "UVaMMRDB"; representing visually distinct types of vehicles, and wherein copies of the images aligned to their type specific showcase view are stored in the MMR database and identified as "SVaMMRDB"; providing a moving object detection system, which is configured to detect region of interest (ROI) of passenger vehicles for classification, and the ROI is registered with the universal view, which aligns landmarks in the ROI, and wherein the aligned ROI is identified as the universal view aligned ROI ("UVaROI"); after illumination normalization, comparing the UVaROI to UVaMMRDB to find the nearest neighbors in the MMRDB, and based on the nearest neighbors, assigning a type to the ROI, and registering the ROI with the showcase view of the type to which it is assigned to and the registration process aligns landmarks in the ROI and the showcase view, and wherein the showcase view aligned ROI is identified as "SVaROI"; and wherein after illumination normalization, comparing the SVaROI to SVaMMRDB to find the nearest neighbors in the MMRDB, and based on these neighbors assigning a make and model to the ROI.

The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

The invention is not limited, however, to the embodiments and variations described above and illustrated in the drawing figures. Various changes, modifications and equivalents could be effected by one skilled in the art without departing from the spirit and scope of the invention as defined in the appended claims. It is expressly intended that all such changes, modifications and equivalents which fall within the scope of the claims are embraced by the claims.

What is claimed is:

1. A method for recognizing a make and a model of passenger vehicles, the method comprising:
constructing a make and model recognition (MMR) database from rear view images of passenger vehicles;
generating a universal view for each type of passenger vehicle (MMRDB) from the make and model recognition database by averaging images from the make and model recognition database;

generating a database of universal views of the passenger vehicles from the generated universal view for the each type of passenger vehicle ("UVaMMRDB");
generating a database of showcase views of the passenger vehicles, wherein each showcase view represents a visually distinct type of passenger vehicle within the generated database of universal views of the passenger vehicles ("SVaMMRDB");
detecting a region of interest (ROI) of a passenger vehicle for classification, and aligning landmarks in the ROI with the database of universal views of the passenger vehicles to obtain a universal view aligned ROI ("UVaROI");
comparing the UVaROI to the UVaMMRDB for the ROI to find nearest neighbors in the MMRDB, and based on the nearest neighbors, assigning a type of passenger vehicle to the ROI;
aligning the landmarks in the ROI with the database of showcase views of the passenger vehicles to obtain a showcase view aligned ROI ("SVaROI"); and
comparing the SVaROI to the SVaMMRDB and assigning the make and the model of the passenger vehicle to the ROI.

2. A non-transitory computer readable recording medium stored with a computer readable program code for recognizing a make and model of passenger vehicles, the computer readable program code configured to execute a process comprising:
constructing a make and model recognition (MMR) database from rear view images of passenger vehicles;
generating a universal view for each type of passenger vehicle (MMRDB) from the make and model recognition database by averaging images from the make and model recognition database;
generating a database of universal views of the passenger vehicles from the generated universal view for the each type of passenger vehicle ("UVaMMRDB");
generating a database of showcase views of the passenger vehicles, wherein each showcase view represents a visually distinct type of passenger vehicle within the generated database of universal views of the passenger vehicles ("SVaMMRDB");
detecting a region of interest (ROI) of a passenger vehicle for classification, and aligning landmarks in the ROI with the database of universal views of the passenger vehicles to obtain a universal view aligned ROI ("UVaROI");
comparing the UVaROI to the UVaMMRDB for the ROI to find nearest neighbors in the MMRDB, and based on the nearest neighbors, assigning a type of passenger vehicle to the ROI;
aligning the landmarks in the ROI with the database of showcase views of the passenger vehicles to obtain a showcase view aligned ROI ("SVaROI"); and
comparing the SVaROI to the SVaMMRDB and assigning the make and the model of the passenger vehicle to the ROI.

3. The method of claim 1, further comprising:
receiving a video steam of images of the passenger vehicle; and
generating the ROI from the video stream of images of the passenger vehicle.

4. The method of claim 1, further comprising:
performing illumination normalization on the detected ROI of the passenger vehicle.

5. The method of claim 1, further comprising:
iteratively improving the universal view by aligning the MMR database to a current universal view and averaging the aligned universal images.

6. The method of claim 1, further comprising:
generating the database of showcase views of the passenger vehicles by averaging images of a particular vehicle type in the MMR database; and
iteratively improving the database of showcase views by aligning the images of the particular vehicle type with a current showcase view and averaging the aligned images.

7. The method of claim 1, wherein the alignment of the ROI to obtain the universal view aligned ROI comprises a two-step alignment process of first aligning rows and secondly aligning columns; and
wherein the alignment steps are interchangeable.

8. A method for recognizing a make and a model of passenger vehicles, the method comprising:
detecting a region of interest (ROI) of a passenger vehicle for classification, and aligning landmarks in the ROI with the database of universal views of the passenger vehicles to obtain a universal view aligned ROI ("UVaROI");
comparing the UVaROI to a database of universal views of passenger vehicles ("UVaMMRDB") for the ROI to find nearest neighbors in a database of universal views for passenger vehicles (MMRDB);
assigning a type of passenger vehicle to the ROI based on the nearest neighbors;
aligning landmarks in the ROI with the database of showcase views of the passenger vehicles to obtain a showcase view aligned ROI ("SVaROI"); and
comparing the SVaROI to a database of showcase views of the passenger vehicles (SVaMMRDB), wherein each showcase view represents a visually distinct type of passenger vehicle within the generated database of universal views of the passenger vehicles and assigning the make and the model of the passenger vehicle to the ROI.

9. The method of claim 8, further comprising:
receiving a video steam of images of the passenger vehicle;
generating the ROI from the video stream of images of the passenger vehicle; and
performing illumination normalization on the detected ROI of the passenger vehicle.

10. The method of claim 8, wherein the images of the passenger vehicles are rear view images, side view images, or front view images.

11. A system for recognizing a make and a model of passenger vehicles, the system comprising:
a computer processor configured to:
construct a make and model recognition (MMR) database from images of passenger vehicles;
generate a universal view for each type of passenger vehicle (MMRDB) from the make and model recognition database by averaging images from the make and model recognition database;
generate a database of universal views of the passenger vehicles from the generated universal view for the each type of passenger vehicle ("UVaMMRDB");
generate a database of showcase views of the passenger vehicles, wherein each showcase view represents a visually distinct type of passenger vehicle within the generated database of universal views of the passenger vehicles ("SVaMMRDB");

detect a region of interest (ROI) of a passenger vehicle for classification, and aligning landmarks in the ROI with the database of universal views of the passenger vehicles to obtain a universal view aligned ROI ("UVaROI");

compare the UVaROI to the UVaMMRDB for the ROI to find nearest neighbors in the MMRDB, and based on the nearest neighbors, assigning a type of passenger vehicle to the ROI;

align landmarks in the ROI with the database of showcase views of the passenger vehicles to obtain a showcase view aligned ROI ("SVaROI"); and compare the SVaROI to the SVaMMRDB and assign the make and the model of the passenger vehicle to the ROI.

12. The system of claim 11, wherein the images of the passenger vehicles are rear view images.

13. The system of claim 11, wherein the computer processor is configured to:
receive a video steam of images of the passenger vehicle; and
generate the ROI from the video stream of images of the passenger vehicle.

14. The system of claim 11, wherein the computer processor is configured to:
perform illumination normalization on the detected ROI of the passenger vehicle.

15. The system of claim 11, wherein the computer processor is configured to:
iteratively improve the universal view by aligning the MMR database to a current universal view and averaging the aligned universal images.

16. The system of claim 11, wherein the computer processor is configured to:
generate the database of showcase views of the passenger vehicles by averaging images of a particular vehicle type in the MMR database.

17. The system of claim 16, wherein the computer processor is configured to:
iteratively improve the database of showcase views by aligning the images of the particular vehicle type with a current showcase view and averaging the aligned images.

18. The system of claim 11, wherein the alignment of the ROI to obtain the universal view aligned ROI comprises a two-step alignment process of first aligning rows and secondly aligning columns; and
wherein the alignment steps are interchangeable.

19. The system of claim 11, wherein the computer processor is configured to:
identify the make and model of the passenger vehicle on a road;
identify the make and the model of the passenger vehicle in a parking garage or parking lot;
identify the make and the model of the passenger vehicle for vehicle fingerprinting and security related applications ensuring limited/controlled access to vehicles; and/or
identify the make and the model of the passenger vehicle in conjunction with automatic license plate recognition and a vehicle registration database to avoid license plate spoofing.

20. The system of claim 11, wherein the computer processor is configured to:
generate the make and model recognition (MMR) database from front and/or side images of passenger vehicles.

* * * * *